United States Patent
Sato

(10) Patent No.: US 9,203,339 B2
(45) Date of Patent: Dec. 1, 2015

(54) MOTOR DRIVING DEVICE AND BRUSHLESS MOTOR

(75) Inventor: Daisuke Sato, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 280 days.

(21) Appl. No.: 14/003,059

(22) PCT Filed: Aug. 7, 2012

(86) PCT No.: PCT/JP2012/005005
§ 371 (c)(1),
(2), (4) Date: Sep. 4, 2013

(87) PCT Pub. No.: WO2013/027348
PCT Pub. Date: Feb. 28, 2013

(65) Prior Publication Data
US 2014/0001999 A1    Jan. 2, 2014

(30) Foreign Application Priority Data

Aug. 24, 2011 (JP) ................................. 2011-182383

(51) Int. Cl.
*H02P 27/04* (2006.01)
*H02P 29/00* (2006.01)
(Continued)

(52) U.S. Cl.
CPC .................. *H02P 29/00* (2013.01); *B60L 11/12* (2013.01); *H02P 6/06* (2013.01); *H02P 27/08* (2013.01); *H02P 2201/00* (2013.01); *Y02T 10/642* (2013.01); *Y02T 10/7077* (2013.01)

(58) Field of Classification Search
CPC ....... H02P 6/16; H02P 21/146; H02P 25/023; H02P 27/06; H02P 31/00; H02P 6/06; H02P 9/009; B60L 15/20; B60L 2240/421; B60L 3/0038

USPC ......... 318/503, 504, 599, 603, 607, 638, 671, 318/400.01, 400.06, 400.13, 400.26
See application file for complete search history.

(56) References Cited

U.S. PATENT DOCUMENTS 4,503,369 A * 3/1985 Nishijima et al. ......... 318/400.3
5,886,491 A * 3/1999 Yoshida et al. ............... 318/592
(Continued)

FOREIGN PATENT DOCUMENTS

| CN | 101160714 | 4/2008 |
|---|---|---|
| JP | 2004-260901 A | 9/2004 |

(Continued)

OTHER PUBLICATIONS

International Search Report for Application No. PCT/JP2012/005005, dated Oct. 30, 2012.
(Continued)

*Primary Examiner* — Bentsu Ro
*Assistant Examiner* — Thai Dinh
(74) *Attorney, Agent, or Firm* — RatnerPrestia

(57) ABSTRACT

A motor driving device according to the present invention includes: a PWM duty ratio detecting unit for detecting a target rotational speed based on a duty ratio of a PWM signal input from a host system; a PWM period detecting unit for detecting a period of the PWM signal; a PWM period error calculating unit for calculating an error between a PWM period output from the PWM period detecting unit and a PWM period previously set as a reference calculated by using the operational clock generator; a position detecting sensor for detecting a permanent magnet of the rotor; and an actual rotational speed calculating unit for calculating an actual rotational speed of the rotor by using a signal output from the position detecting sensor. The present motor driving device controls a speed while correcting the actual rotational speed based on the PWM period error.

8 Claims, 4 Drawing Sheets

(51) Int. Cl.
*H02P 27/08* (2006.01)
*H02P 6/06* (2006.01)
*B60L 11/12* (2006.01)

(56) References Cited

U.S. PATENT DOCUMENTS

| | | | |
|---|---|---|---|
| 7,230,401 B2 * | 6/2007 | Muroi et al. | 318/466 |
| 8,917,041 B2 * | 12/2014 | Kishimoto et al. | 318/400.14 |
| 2009/0179709 A1 | 7/2009 | Zhu et al. | |
| 2010/0072938 A1 * | 3/2010 | Reichert et al. | 318/640 |

FOREIGN PATENT DOCUMENTS

| | | |
|---|---|---|
| JP | 2010-061470 A | 3/2010 |
| JP | 2010-104115 A | 5/2010 |
| JP | 2011-172350 A | 9/2011 |

OTHER PUBLICATIONS

English Translation of Chinese Search Report dated Jun. 2, 2015 for the related Chinese Patent Application No. 201280013288.5.

* cited by examiner

MOTOR DRIVING DEVICE AND BRUSHLESS MOTOR

THIS APPLICATION IS A U.S. NATIONAL PHASE APPLICATION OF PCT INTERNATIONAL APPLICATION PCT/JP2012/005005.

TECHNICAL FIELD

The present invention relates to a motor driving device for driving a motor so as to correct the deviation of the rotational speed of the motor, and a brushless motor.

BACKGROUND ART

A hybrid car or an electric car mounts thereon a large-sized battery in order to allow itself to travel, and further, mounts thereon an air cooling blower serving as a motor provided with an impeller, as a cooling means for a circuit equipped with the battery. Cooling performance (the flow rate of air) that is required at that time is determined according to a vehicular traveling status such as a current flowing in the circuit. Therefore, the blower needs to be controlled in such a manner as to satisfy the required cooling performance. The variations of the cooling performance depend upon the blower, and particularly, greatly depend upon the variations of the rotational speed of the impeller.

As a consequence, in the case where it is assumed that the variations of the rotational speed are large so that the required cooling performance cannot be satisfied, the variations of the rotational speed have been conventionally reduced by actuating the impeller at a higher rotational speed or increasing the precision of an operational clock of a unit (i.e., a microcomputer) for measuring the rotational speed at a design stage in advance. In the meantime, means for correcting the operational clock has included a method for acquiring a clock error from a control IC via serial communications (see, for example, Patent Literature 1).

However, the above-described conventional technique needs to largely set an allowable current or heat radiation amount in a motor driving circuit so as to achieve a higher rotational speed. Therefore, a blower unit including the circuit in the conventional technique has been undesirably increased in size. In the case where the car mounts thereon a highly precise clock or a serial communication circuit, there is a problem to be solved of an increase in cost accordingly.

CITATION LIST

Patent Literature

PTL 1: Unexamined Japanese Patent Publication No. 2010-061470

SUMMARY OF THE INVENTION

A motor driving device according to the present invention includes: a PWM duty ratio detecting unit for detecting a target rotational speed based on a duty ratio of a PWM signal input from a host system; a PWM period detecting unit for detecting a period of the PWM signal; a PWM period error calculating unit for calculating an error between a PWM period output from the PWM period detecting unit and a PWM period previously set as a reference calculated by using the operational clock generator; a position detecting sensor for detecting a permanent magnet of the rotor; and an actual rotational speed calculating unit for calculating an actual rotational speed of the rotor by using a signal output from the position detecting sensor. The present motor driving device controls a speed while correcting the actual rotational speed based on the PWM period error.

With the motor driving device according to the present invention, a control circuit disposed in a blower corrects and detects the actual rotational speed of a motor shaft based on the PWM signal output from the host system all the time. Consequently, even when not only the variations (i.e., a period deviation) of the individual operational clock disposed in the blower are large but also a motor coil or a circuit generates heat, it is possible to suppress a deviation of the actual rotational speed caused by temperature characteristics (i.e., a period deviation) of the operational clock, so as to provide a blower driving method and a blower driving device capable of achieving a stable cooling performance.

DESCRIPTION OF EMBODIMENT

Hereinafter, a motor driving device and a brushless motor provided in a blower or the like in an exemplary embodiment according to the present invention will be described with reference to the attached drawings.

(First Exemplary Embodiment)

Figure 1:
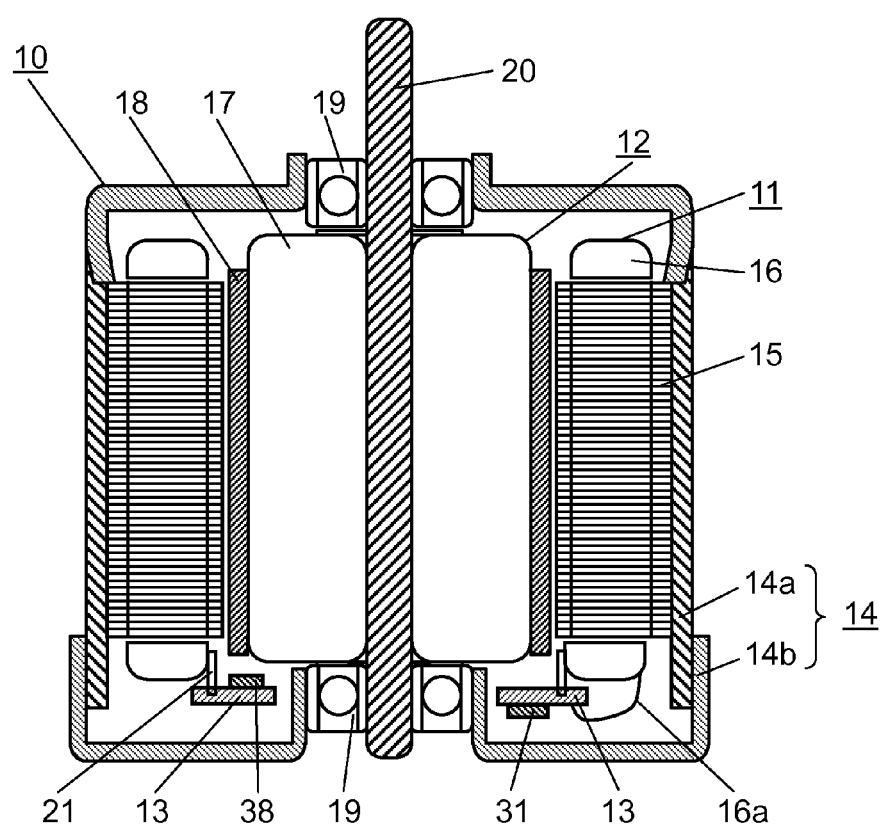
FIG. 1 is a view showing the structure of a brushless motor in a first exemplary embodiment according to the present invention.

FIG. 1 is a view showing the structure of brushless motor 10 provided in a blower in a first exemplary embodiment according to the present invention. The present exemplary embodiment exemplifies an inner rotor type brushless motor, in which a rotor is rotatably disposed on the inner circumferential side of a stator. The brushless motor in the present exemplary embodiment has coils in a plurality of phases, and is rotationally driven in each of the phases in response to a signal that is subjected to pulse width modulation (hereinafter appropriately abbreviated as "PWM").

As shown in FIG. 1, brushless motor 10 is provided with stator 11, rotor 12, circuit board 13, and motor case 14. Motor case 14 is made of a cylindrical metal that is hermetically sealed. Brushless motor 10 is configured to house stator 11, rotor 12, and circuit board 13 inside motor case 14. Motor case 14 is constituted of case body 14a and case cover 14b. Case body 14a is covered with case cover 14b, thus obtaining substantially hermetically sealed motor case 14.

In FIG. 1, stator 11 is configured by winding coil 16 in each phase around stator iron core 15. The present exemplary embodiment exemplifies that coil 16 divided into three phases U, V, and W that are deviated by 120 is wound around stator iron core 15. Stator iron core 15 has a plurality of salient poles projecting toward the inner circumference. Moreover, the outer periphery of stator iron core 15 is formed into a substantially cylindrical shape, and is fixed to case body 14a.

Rotor 12 is inserted into stator 11 with a clearance. Rotor 12 holds cylindrical permanent magnet 18 at the outer periphery of rotor frame 17, and is disposed in such a manner as to be freely rotated about rotary shaft 20 supported by bearings 19. That is to say, rotor 12 and stator 11 are disposed in such a manner that the tip of the salient pole of stator iron core 15 and the outer peripheral surface of permanent magnet 18 face each other.

Additionally, in brushless motor 10, circuit board 13 having various kinds of circuit parts 31 mounted thereon is housed inside motor case 14. Circuit parts 31 constitute a motor driving device for controlling or driving the motor. Furthermore, circuit board 13 mounts thereon position detecting sensor 38 such as a Hall device for detecting the rotational position of rotor 12. Support member 21 is disposed in stator iron core 15. Circuit board 13 is fitted inside motor case 14 via support member 21. The ends of coil 16 in the U, V, and W phases are drawn from stator 11 as lead wires 16a that are connected to circuit board 13.

In order to obtain the above-described configuration, first, stator 11 is inserted into case body 14a, and then, is fixed to the inner surface of case body 14a. Next, rotor 12 and circuit board 13 are contained inside case body 14a, before case cover 14b is secured to case body 14a. With these procedures, brushless motor 10 is formed in such a manner as to incorporate therein the position detecting sensor and the motor driving device. Incidentally, brushless motor 10 may be integrated with the motor driving device. In particular, motor case 14 is made of metal, so as to provide a shielding effect, thus suppressing an electromagnetic noise that radiates from circuit board 13 or stator 11 to the outside. Moreover, stator iron core 15 is fixed directly to case body 14a, and therefore, heat generated at stator 11 can radiate to the outside via the metallic motor case 14.

A power supply voltage or a control signal from the outside is supplied to brushless motor 10 thus configured as described above, so that the motor driving device at circuit board 13 allows a drive current to flow in coil 16, thus generating a magnetic field at stator iron core 15. In this manner, the magnetic field generated at stator iron core 15 and a magnetic field generated at permanent magnet 18 produce an attractive force and a repulsive force according to the polarities of the magnetic fields. These forces allow rotor 12 to be rotated about rotary shaft 20.

Here, the present exemplary embodiment has been described by way of the above-described inner rotor type brushless motor. However, an outer motor type brushless motor may be used, and further, rotor rotating motors in general such as a motor with a brush may be used.

Additionally, an impeller for blowing air is attached to rotary shaft 20 of brushless motor 10, thus configuring a blower for use in cooling air and so on.

Next, a description will be given of the motor driving device in the present exemplary embodiment that is constituted of position detecting sensor 38 and circuit parts 31 mounted on circuit board 13.

Figure 2:
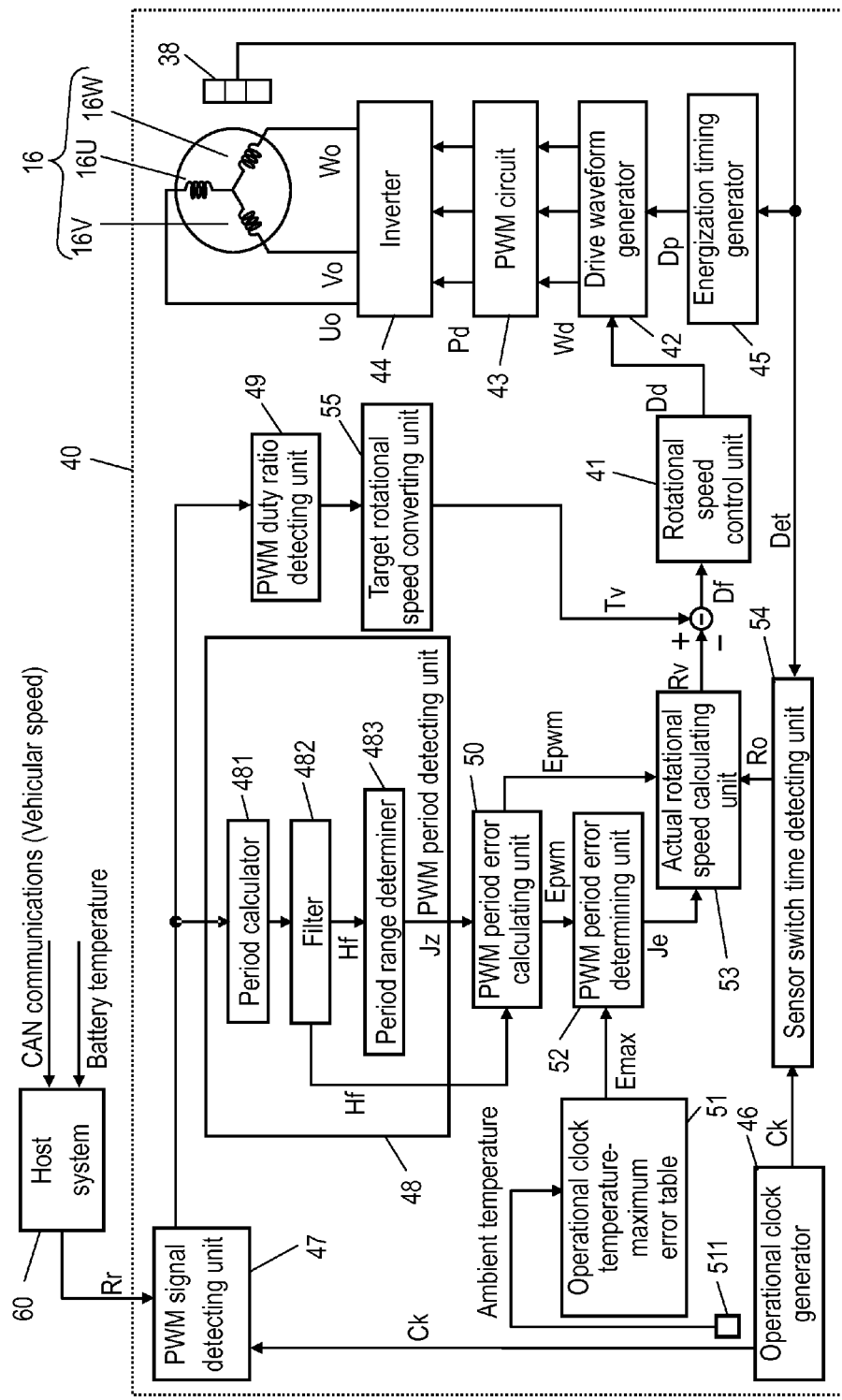
FIG. 2 is a block diagram illustrating a motor driving device in the first exemplary embodiment according to the present invention.

FIG. 2 is a block diagram illustrating motor driving device 40 for brushless motor 10 in the present exemplary embodiment. Motor driving device 40 includes: rotational speed control unit 41, drive waveform generator 42, PWM circuit 43, inverter 44, energization timing generator 45, operational clock generator 46, PWM signal detecting unit 47, PWM period detecting unit 48, PWM duty ratio detecting unit 49, PWM period error calculating unit 50, operational clock temperature-maximum error table 51, PWM period error determining unit 52, actual rotational speed calculating unit 53, sensor switch time detecting unit 54, and target rotational speed converting unit 55 in addition to position detecting sensor 38 corresponding to the three phases, respectively.

Moreover, motor driving device 40 is notified command signal Rr which indicates a rotational speed (rpm) per, for example, minute as a target rotational speed from host system 60 disposed outside, for example. PWM signal detecting unit 47 and sensor switch time detecting unit 54 detect a PWM signal and a sensor switch time, respectively, in response to signal Ck that is clock signal output from operational clock generator 46. In the present exemplary embodiment, host system 60 outputs command signal Rr that is a signal subjected to PWM (abbreviating pulse width modulation), and then, gives the target rotational speed to motor driving device 40 in a duty ratio of the PWM signal. Along with this, there is shown one example in which actual rotational speed signal Rv is generated based on detected PWM signal period error Epwm and output signal Det output from position detecting sensor 38 for detecting the rotational position of rotor 12.

Specifically, command signal Rr as the PWM signal serving as command transmitting means is input from host system 60, and then, the target rotational speed is given by the duty ratio. Incidentally, the period of the PWM signal is a fixed value that has previously determined as a design period, for example, a period of 2 ms at a frequency of 500 Hz. PWM signal detecting unit 47 counts the time widths of signal levels High and Low of the input PWM waveform by using clock signal Ck output from operational clock generator 46 provided at a blower. PWM period detecting unit 48 and PWM duty ratio detecting unit 49 are notified of the resultant both count values. PWM duty ratio detecting unit 49 detects a duty ratio and a period by using the signal output from PWM signal detecting unit 47. Target rotational speed converting unit 55 converts signals indicating the duty ratio and the period output from PWM duty ratio detecting unit 49 into the target rotational speed indicated by command signal Rr, and then, outputs command signal Tv indicating the target rotational speed. In order to perform the above-described counting operation, the frequency of clock signal Ck is set to a much higher frequency than that of the PWM signal.

Here, normally, host system 60 is operated by a highly precise clock using, for example, a crystal oscillator. Therefore, the pulse period of PWM of command signal Rr supplied from host system 60 also is high in precision. In contrast, from the viewpoint of a cost, the clock precision of operational clock generator 46 in motor driving device 40 is generally low, and for example, a frequency fluctuation caused by temperature also is greater than that in host system 60. Although the details will be described later, the precision of the rotational speed is secured by using the pulse period of such highly precise command signal Rr in the present exemplary embodiment.

Period calculator 481 in PWM period detecting unit 48 calculates the High and Low time widths of a PWM waveform and a PWM period added with both of the time widths based on the count values counted by PWM signal detecting unit 47. Thereafter, filter 482 filters the results in order to prevent any abrupt change in period caused by a noise or the like, and then, outputs PWM period Hf. Here, filter 482 is a low-pass filter or an averaging filter. Period range determiner 483 determines whether or not PWM period Hf is on a noise level, and then, outputs the determination result as OK/NG signal Jz to PWM period error calculating unit 50. PWM period error calculating unit 50 calculates period error Epwm indicating a difference between a predetermined period and the detected period of the PWM signal. Incidentally, if the determination is that signal Jz output from period range determiner 483 is NG, that is, PWM period Hf is on the noise level, previous PWM period error Epwm is output.

Figure 3:
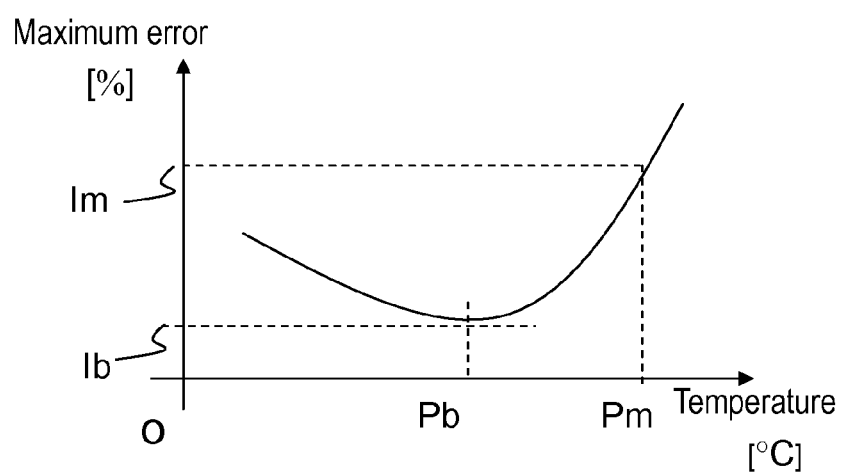
FIG. 3 is a graph illustrating the characteristics of the relationship between the temperature of an operational clock and a maximum error.

FIG. 3 is a graph illustrating the relationship between temperature around the assembled position of an operational clock generator provided at the blower and a maximum error, and it is one example of operational clock temperature-maximum error table 51 illustrated in FIG. 2. Operational clock temperature-maximum error table 51 acquires an ambient temperature output from temperature sensor 511, and then, derives the maximum error of the operational clock provided at the motor at that temperature. PWM period error determining unit 52 compares maximum error Emax of the operational clock with period error Epwm of the detected PWM signal, and then, outputs error determination signal Je. Sensor switch time detecting unit 54 counts positional information indicated by position detecting sensor signal Det output from position detecting sensor 38, by using clock signal Ck output from operational clock generator 46, like in the case of the PWM period. Moreover, sensor switch time detecting unit 54 calculates the rotational speed of rotor 12 based on, for example, differentiation, thereby outputting detection speed signal Ro. Here, sensor switch time detecting unit 54 counts clock signal Ck having a low frequency precision in operational clock generator 46, and then, calculates the rotational speed based on the count value. Consequently, the precision of the calculated rotational speed also is low. In the present exemplary embodiment, actual rotational speed calculating unit 53, described later, compensates the precision of an actual rotational speed with respect to detection speed signal Ro having a low precision output from sensor switch time detecting unit 54.

Actual rotational speed calculating unit 53 performs multiplication by using error determination signal Je output from PWM period error determining unit 52 and PWM period error signal Epwm output from PWM period error calculating unit 50, and then, outputs the result as actual rotational speed signal Rv. In other words, actual rotational speed calculating unit 53 corrects detection speed signal Ro by using period error Epwm, and then, outputs the corrected actual rotational speed as actual rotational speed signal Rv.

Assuming that, for example, a frequency corresponding to a design period of the PWM is set to 500 Hz and a frequency corresponding to the period obtained by counting clock signal Ck output from operational clock generator 46 by PWM period detecting unit 48 is 505 Hz, the PWM period error is 5 Hz. Actual rotational speed calculating unit 53 corrects detection speed signal Ro by using PWM period period error signal Epwm indicating the PWM period error, thereby outputting actual rotational speed signal Rv.

However, in the case where PWM period error determining unit 52 determines that PWM period error signal Epwm is greater, detection speed signal Ro output from sensor switch time detecting unit 54 is output as actual rotational speed signal Rv without performing the correcting processing by the use of PWM period error signal Epwm.

Rotational speed control unit 41 generates rotation control signal Dd indicating a torque amount according to a deviation Df between command signal Tv indicating the target rotational speed and actual rotational speed signal Rv indicating the actual rotational speed calculated by actual rotational speed calculating unit 53 so as to rotate the motor at the actual speed according to the target rotational speed, thus supplying the signal to drive waveform generator 42. Drive waveform generator 42 generates, per phase, waveform signal Wd for driving coil 16, and then, supplies generated waveform signal Wd to PWM circuit 43. When coil 16 is sinusoidally driven, waveform signal Wd is a sinusoidal signal: in contrast, coil 16 is rectangularly driven, waveform signal Wd is a rectangular signal. Moreover, the amplitude of waveform signal Wd depends upon rotation control signal Dd. A timing for supplying waveform signal Wd to PWM circuit 43 depends upon energization phase signal Dp output from energization timing generator 45. With respect to a reference timing, if a timing according to energization phase signal Dp has a phase in an advance direction, the timing is a so-called advance angle: in contrast, if it has a phase in a delay direction, the timing is a delay angle.

PWM circuit 43 subjects waveform signal Wd as a modulation signal supplied per phase from drive waveform generator 42 to the pulse width modulation (abbreviated as "PWM"). In this manner, PWM circuit 43 supplies drive pulse signal Pd as a signal of a pulse train subjected to the pulse width modulation with waveform signal Wd to inverter 44. Inverter 44 energizes coil 16 per phase based on drive pulse signal Pd, thereby driving coil 16. Inverter 44 is provided with a switch device connected onto a positive electrode side of a power source and a switch device connected onto a negative electrode side at each of a U-phase, a V-phase, and a W-phase.

Moreover, both of the switch devices on the positive and negative electrode sides are connected to each other on a side opposite to the power source. The connected portion serves as a drive output terminal for driving coil 16 from inverter 44. Drive output terminal Uo of a U phase, drive output terminal Vo of a V phase, and drive output terminal Wo of a W phase are connected to coil 16U, coil 16V, and coil 16W, respectively, via lead wires 16a. When the switch device is turned on or off in response to drive pulse signal Pd in each of the phases, a drive current flows in coil 16 from the drive output terminal via the switch device that is turned on by the power source. Here, drive pulse signal Pd is the signal obtained by subjecting waveform signal Wd to the pulse width modulation. Therefore, each of the switch devices is turned on or off in the above-described manner, so that each of coils 16 is energized at the drive current according to waveform signal Wd.

Subsequently, explanation will be made on the configuration for generating energization phase signal Dp. First, position detecting sensor 38 mounted on circuit board 13 detects a magnetic change of permanent magnet 18 of rotor 12 that is rotated, and then, outputs the result as position detecting sensor signal Det. Position detecting sensor signal Det is supplied to energization timing generator 45 and sensor switch time detecting unit 54.

Energization timing generator 45 generates an energization timing having a phase deviated from the reference timing by a predetermined advance angle in order to adjust the phase delay (i.e., the phase delay with respect to the reference timing caused by an influence of inductance of the coil) of the drive current flowing in coil 16 of brushless motor 10 while using a timing of position detecting sensor signal Det as a reference timing. And then, energization timing generator 45 generates energization phase signal Dp indicating the timing advanced by the predetermined advance angle from the reference timing. Such energization phase signal Dp is supplied to drive waveform generator 42. In this manner, drive waveform generator 42 outputs waveform signal Wd at the timing advanced from the reference timing by energization phase signal Dp based on position detecting sensor signal Det. That is to say, motor driving device 40 is operated in such a manner as to energize and driving coil 16 with waveform signal Wd of an amplitude according to rotation control signal Dd and of the phase according to the advance angle.

With the above-described configuration, a feedback control loop for controlling the rotational speed of rotor 12 in response to command signal Rr is formed. In other words, in the present exemplary embodiment, the rotational speed is subjected to the feedback control such that rotor 12 is rotated following the command rotational speed, so that rotor 12 is rotated.

Figure 4:
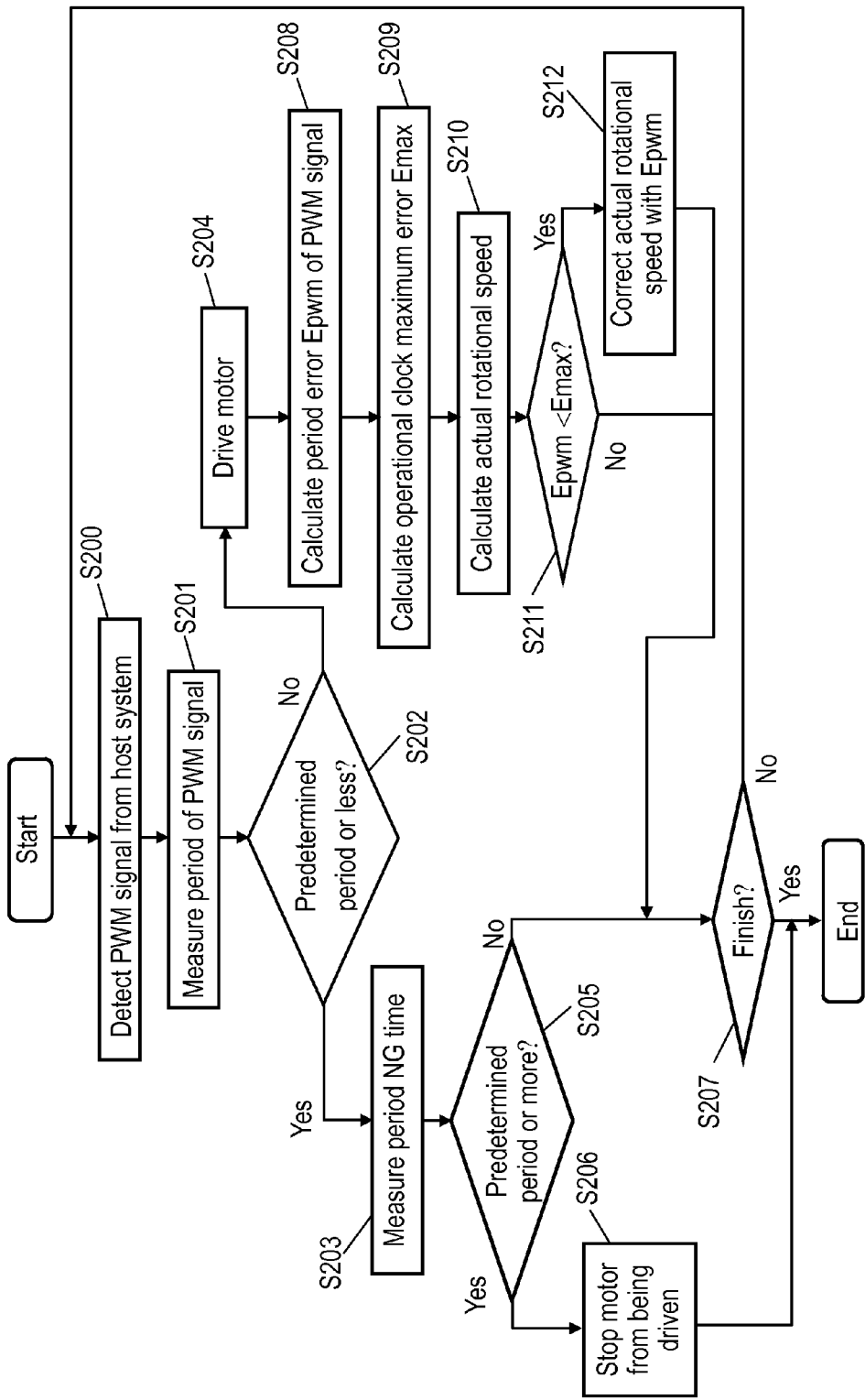
FIG. 4 is a flowchart illustrating one example of procedures by the motor driving device in the first exemplary embodiment according to the present invention.

FIG. 4 is a flowchart illustrating one example of procedures by a motor driving method in the present exemplary embodiment. A processing routine according to the present flowchart is repeatedly executed per execution period (e.g., 10 usec) as long as the motor is stopped from being driven due to abnormality of the PWM period. Incidentally, although the configuration of motor driving device 40 has been described by way of the functional block illustrated in FIG. 2, a motor driving method described below may be implemented by way of a program with a configuration provided with a microcomputer.

The flowchart illustrated in FIG. 4 and the block diagram illustrated in FIG. 2 correspond to each other as follows: PWM signal detecting unit 47, period calculator 481 and filter 482, period range determining unit 483, and PWM period error calculating unit 50 correspond to steps S200, S201, S202, and S203 and S208, respectively.

Referring to FIG. 4, upon the start of the processing of the present motor driving method, first, the PWM signal output from host system 60 as command signal Rr is started to be detected (step S200). After the PWM signal is detected, the period is measured (step S201).

Next, in order to determine the noise of the detected PWM signal, it is checked whether or not the period is a predetermined value or lower (step S202). If the period is a predetermined value or lower, it is determined that there is a noise (NG), and then, the routine proceeds to step S203. In contrast, if the period is a predetermined value or higher, it is determined that there is not a noise (OK), and then, the routine proceeds to step S204. In step S203, the NG period, that is, a period when it is determined that there is a noise is measured.

Subsequently, it is determined whether or not the noise is sequentially input so that the NG period is a predetermined value or more (step S205). If the NG period is a predetermined value or more, the driving of the motor is stopped (step S206). In contrast, if the NG period is a predetermined value or less, the routine proceeds to step S207, in which it is determined whether or not the motor driving processing is finished. In the meantime, in step S204, the rotating operation is started in the case of the stoppage of the motor. Subsequently, the period error Epwm is calculated based on the design period value of the PWM signal input from host system 60 and a period value of the detected PWM signal (step S208). Here, the design period means a standard period of the PWM signal predetermined on the design stage or the like for the present blower. Thereafter, the maximum error of the operational clock is calculated with reference to the operational clock temperature-maximum error table by using a value acquired from temperature sensor 511 of the blower motor (step S209).

Subsequently, the actual rotational speed of the motor output shaft is calculated by using position detecting sensor 38 (step S210). The order of steps S204, S208, and S209 may be transposed. After the calculation of the period error Epwm of the detected PWM signal and the maximum error Emax of the operational clock, the magnitude relationship is compared (step S211). If the period error Epwm of the detected PWM signal is smaller than the maximum error Emax of the operational clock, the actual rotational speed is corrected by using the period error Epwm (step S212).

In contrast, if the period error Epwm of the detected PWM signal is greater than the maximum error Emax of the operational clock, it is determined that host system 60 that generated and output the PWM signal is abnormal with respect to the clock, and then, the routine proceeds to finish determining step S207 without correcting the actual rotational speed with period error Epwm. Unless host system 60 or the like output a command for the end of the processing, the routine is repeated from step S200 to step S212. When the finish is instructed, the processing of the present motor driving method is ended (step S207).

Moreover, when the actual rotational speed is corrected with PWM period error Epwm in the processing illustrated in FIG. 4, a technique in which value Epwm is gradually incremented or decremented from 1 may be adopted. In this case, it is possible to suppress the temporary fluctuation of the PWM period caused by the noise or the like or the fluctuation of the rotational speed caused by the temporary fluctuation, and the noise.

As described above, the motor driving device according to the present invention includes the control circuit such as the microcomputer that is operated by the use of the clock having a low frequency precision (e.g., a built-in RC clock). Moreover, the host system (e.g., a battery ECU mounted on a car) has a CAN communication function or the like. In order to fulfill the function, the host system is operated according to a highly precise clock all the time. The rotational speed of the motor output shaft for rotating the impeller is given from the host system to the blower including the present motor driving device by the use of the duty ratio of the PWM signal. The present motor driving device detects the rotational speed of the motor output shaft based on the time when the signal level output from the position detecting sensor (e.g., a Hall sensor) is switched from ON to OFF and from OFF to ON. Additionally, the present motor driving device measures the period of the PWM signal output from the host system with high precision all the time, and further, recognizes the period error. The calculated rotational speed is multiplied with the period error, so that the actual rotational speed is calculated, thus executing the speed feedback control.

As a consequence, even if the error of the operational clock (e.g., a clock built in a microcomputer or an external clock) provided in the motor driving device is large, the actual rotational speed of the motor output shaft can be measured with high precision, thus controlling the speed. Therefore, when the present motor driving device is mounted on the blower, stable cooling performance having small variations per individual blower can be achieved.

In addition, the motor driving device according to the present invention is equipped with the check function for the filter such as a low-pass filter or an averaging filter and the period range when the PWM signal period output from the host system is measured.

In this manner, even if the period error, and further, the real rotational speed calculated becomes unstable with the application of the noise to the PWM signal, an increase in motor rotational noise can be suppressed.

Furthermore, the motor driving device according to the present invention has the maximum error conversion table per temperature with respect to the operational clock provided therein. In the case where the PWM signal period error is greater than the maximum error of the operational clock derived from the ambient temperature at that time, the actual rotational speed using the PWM signal period error is not corrected but only the operational clock provided therein (e.g., the clock of 8 MHz) calculates the actual rotational speed.

Consequently, when the clock abnormality (i.e., the degradation of the precision) occurs in the host system, the actual rotational speed can be measured without inducing a markedly degradation of the precision, thus enabling the motor rotational error to be suppressed.

Additionally, the motor driving device according to the present invention is equipped with the function of implementing the above-described motor driving method, and therefore, is configured to rotationally drive the rotor based on the target rotational speed given by the host system.

In addition, the host system connected to the blower including the motor driving device according to the present invention via the signal is provided with the control circuit having the microcomputer mounted thereon, wherein there are provided the highly precise clock generating unit for actuating the microcomputer, the target rotational speed generating unit for generating the target rotational speed of the blower according to the required cooling performance, the PWM duty ratio generating unit for generating the duty ratio of the PWM signal based on the target rotational speed, and the waveform generating unit for generating the PWM waveform in response to the highly precise clock signal. Furthermore, there is provided the PWM circuit for generating the pulse signal whose pulse width is modulated in response to the waveform signal supplied from the waveform generating unit. The host system may be configured in the above-described manner.

Furthermore, the motor driving device according to the present invention is the driving device including the control circuit having the microcomputer mounted thereon, the microcomputer being provided with the operational clock generator. There are provided the PWM signal detecting unit for measuring the High and Low times of the PWM signal output from the host system by using the signal output from the operational clock generator, and the PWM duty ratio detecting unit and the PWM period detecting unit for detecting the duty ratio and the period by using the signal output from the PWM signal detecting unit. Moreover, there are provided the target rotational speed converting unit for converting the rotational speed into the target rotational speed by using the signal output from the duty ratio detecting unit and the PWM period error calculating unit for calculating the PWM period error (e.g., 5 kHz in this case) by using the signal output from the PWM period detecting unit (the period signal counted by using operational clock generator 46, for example, 505 kHz) and the design period of the PWM (the predetermined period in the viewpoint of the design, for example, 500 kHz counted by using operational clock generator 46). Moreover, the motor driving device according to the present invention is provided with the sensor switch time detecting unit for detecting the switch time when the signal level output from the position detecting sensor (e.g., a Hall sensor) is switched from ON to OFF and from OFF to ON and the actual rotational speed calculating unit for calculating the actual rotational speed by using the signals output from the sensor switch time detecting unit and the period error calculating unit. The motor driving device according to the present invention is configured to execute the speed feedback control by using the signals output from the target rotational speed calculating unit and the actual rotational speed calculating unit.

With this configuration, even if the error of the operational clock is large in, for example, the microcomputer mounted on the blower, the rotational speed of the motor output shaft can be detected with high precision, thus achieving the stable cooling performance with small variations in the individual blower.

The motor driving device according to the present invention is provided with the filter such as a low-pass filter or an averaging filter and the period range determining unit in the PWM period detecting unit for detecting the period of the PWM signal output from the host system.

Consequently, it is possible to suppress an increase in blower rotational noise caused by the period error and the unstable actual rotational speed calculated when the noise is applied to the PWM signal.

Additionally, the motor driving device according to the present invention is provided with the maximum error table per temperature relating to the operational clock generator disposed in the blower. As a consequence, in the case where the PWM period error is larger than the maximum error derived from the ambient temperature at that time in the operational clock generator, the correction of the actual rotational speed using the PWM period error is not carried out but the actual rotational speed is calculated only with the signal output from the operational clock generator disposed in the blower.

Consequently, when the clock abnormality (i.e., the degradation of precision) occurs in the host system, the blower motor driving device can measure the actual rotational speed without inducing the marked degradation of the precision, thus suppressing the blower rotational error.

As described above, the motor driving device according to the present invention receives the command signal supplied to the motor as the PWM signal and the duty ratio of the PWM signal as the target rotational speed. Therefore, the motor driving device according to the present invention is configured to measure the period of the PWM signal all the time, correct the actual rotational speed calculated by the position detecting sensor, by using the period error at that time, and thus control the rotation.

In addition, the motor driving device according to the present invention is configured to correct the actual rotational speed calculated by the position detecting sensor by using the previously detected error of the PWM period when the period of the given PWM signal is the predetermined value or lower and the period determining unit in the PWM period detecting unit determines "noise," and thus, control the rotation.

Moreover, the motor driving device according to the present invention has the table illustrating the relationship between the temperature of the operational clock disposed in the motor and the maximum error, and is configured to control the rotation as it is without correcting the actual rotational speed calculated by the position detecting sensor when the PWM period error determining unit determines that the period error of the PWM signal is large. Furthermore, the brushless motor according to the present invention is configured to incorporate the motor driving device or to be integrated with the motor driving device.

Hence, according to the present invention, it is possible to suppress the deviation of the rotational speed of the brushless motor disposed in the blower or the like, so as to provide the motor driving device capable of achieving the stable rotational speed having the small variations and the stable cooling performance, and brushless motor.

INDUSTRIAL APPLICABILITY

The motor driving device and brushless motor according to the present invention can suppress the deviation of the rotational speed so as to achieve the stable rotational speed even in the case of the degradation of the precision of the operational clock caused by heat generation or the like during the energization and driving, and therefore, it is useful for a motor for use in electric equipment and, particularly, is suitably used on a vehicle having violent temperature fluctuations.

The invention claimed is:

1. A motor driving device including a rotor which holds a permanent magnet and is rotatably disposed about a rotary shaft, a stator in which a coil for each phase is wound around a stator iron core having a plurality of salient poles, a motor driving circuit for energizing the coil, and an operational clock generator for generating a clock signal for the motor driving circuit, the motor driving device comprising:
   a PWM duty ratio detecting unit for detecting a target rotational speed based on a duty ratio of a PWM signal input from a host system;
   a PWM period detecting unit for detecting a period of the PWM signal;
   a PWM period error calculating unit for calculating an error between a PWM period output from the PWM period detecting unit and a PWM period previously set as a reference calculated by using the operational clock generator;
   a position detecting sensor for detecting a permanent magnet of the rotor; and
   an actual rotational speed calculating unit for calculating an actual rotational speed of the rotor by using a signal output from the position detecting sensor, wherein
   the motor driving device controls a speed while correcting the actual rotational speed based on the PWM period error.

2. The motor driving device according to claim 1 further comprising:
   a temperature sensor for measuring a temperature inside a motor; and
   an operational clock temperature-maximum error table indicating an error of the operational clock at each temperature measured by the temperature sensor, wherein
   the speed is controlled while carrying out a correction by the PWM period error calculating unit when a maximum error derived from the temperature inside the motor and the operational clock temperature-maximum error table is greater than the PWM period error calculated from the signal of the PWM period detecting unit inputting the PWM signal from the host system.

3. The motor driving device according to claim 2, wherein the PWM period detecting unit includes a filter, and a previous period error is output or the motor is stopped from being driven when a detected period of the PWM signal input from the host system is smaller than a predetermined period.

4. The motor driving device according to claim 3, wherein the filter is one of a low-pass filter and an averaging filter.

5. A brushless motor incorporating therein or being integrated with the motor driving device according to claim 2.

6. The motor driving device according to claim 1, wherein the PWM period detecting unit includes a filter, and a previous period error is output or the motor is stopped from being driven when a detected period of the PWM signal input from the host system is smaller than a predetermined period.

7. The motor driving device according to claim 6, wherein the filter is one of a low-pass filter and an averaging filter.

8. A brushless motor incorporating therein or being integrated with the motor driving device according to claim 1.

* * * * *